(12) United States Patent
Tolan et al.

(10) Patent No.: US 11,375,597 B1
(45) Date of Patent: Jun. 28, 2022

(54) SIMPLE SOUND CONTROL OF UNDERWATER LIGHTS

(71) Applicant: Light & Motion Industries, Marina, CA (US)

(72) Inventors: David W. Tolan, Carmel, CA (US); Brooks P. Lame, Seaside, CA (US); Joseph G. Goldman, Carmel, CA (US); Devin P. McKee, Pacific Grove, CA (US); Daniel T. Emerson, Carmel, CA (US)

(73) Assignee: Light & Motion Industries, Marina, CA (US)

( * ) Notice: Subject to any disclaimer, the term of this patent is extended or adjusted under 35 U.S.C. 154(b) by 0 days.

(21) Appl. No.: 17/303,711

(22) Filed: Jun. 4, 2021

Related U.S. Application Data

(60) Provisional application No. 63/035,608, filed on Jun. 5, 2020.

(51) Int. Cl.
*H05B 47/12* (2020.01)
*G03B 15/03* (2021.01)
*F21V 31/00* (2006.01)

(52) U.S. Cl.
CPC .............. *H05B 47/12* (2020.01); *G03B 15/03* (2013.01); *F21V 31/005* (2013.01)

(58) Field of Classification Search
CPC ........ H05B 47/12; G03B 15/03; F21V 31/005
See application file for complete search history.

(56) References Cited

U.S. PATENT DOCUMENTS

| | | | | |
|---|---|---|---|---|
| 5,974,273 | A * | 10/1999 | Larkin | G03B 15/05 396/162 |
| 9,239,512 | B2 * | 1/2016 | Foss | G03B 17/08 |
| 9,808,397 | B2 * | 11/2017 | Breau | H05B 47/10 |
| 9,863,622 | B1 * | 1/2018 | Armer | F21V 23/0414 |
| 10,863,163 | B2 * | 12/2020 | Aurigema | H04N 5/232 |
| 2012/0139446 | A1 * | 6/2012 | Koren | H05B 45/00 315/297 |
| 2019/0202537 | A1 * | 7/2019 | Easterling | B63C 11/26 |

FOREIGN PATENT DOCUMENTS

FR  2624334 A1 *  6/1989  ............ H05B 47/10

OTHER PUBLICATIONS

SeaLife Cameras ("Sealife Sea Dragon 3000F Auto Light"; https://www.sealife-cameras.com/product/sea-dragon-3000f-auto/; published: Aug. 2020 (Year: 2020).*

* cited by examiner

*Primary Examiner* — Borna Alaeddini
(74) *Attorney, Agent, or Firm* — Thomas M. Freiburger

(57) ABSTRACT

A control system for underwater diving lights utilizes sounds of specific frequency emitted by action of a diver to control one or more remotely positioned diving lights.

15 Claims, 4 Drawing Sheets

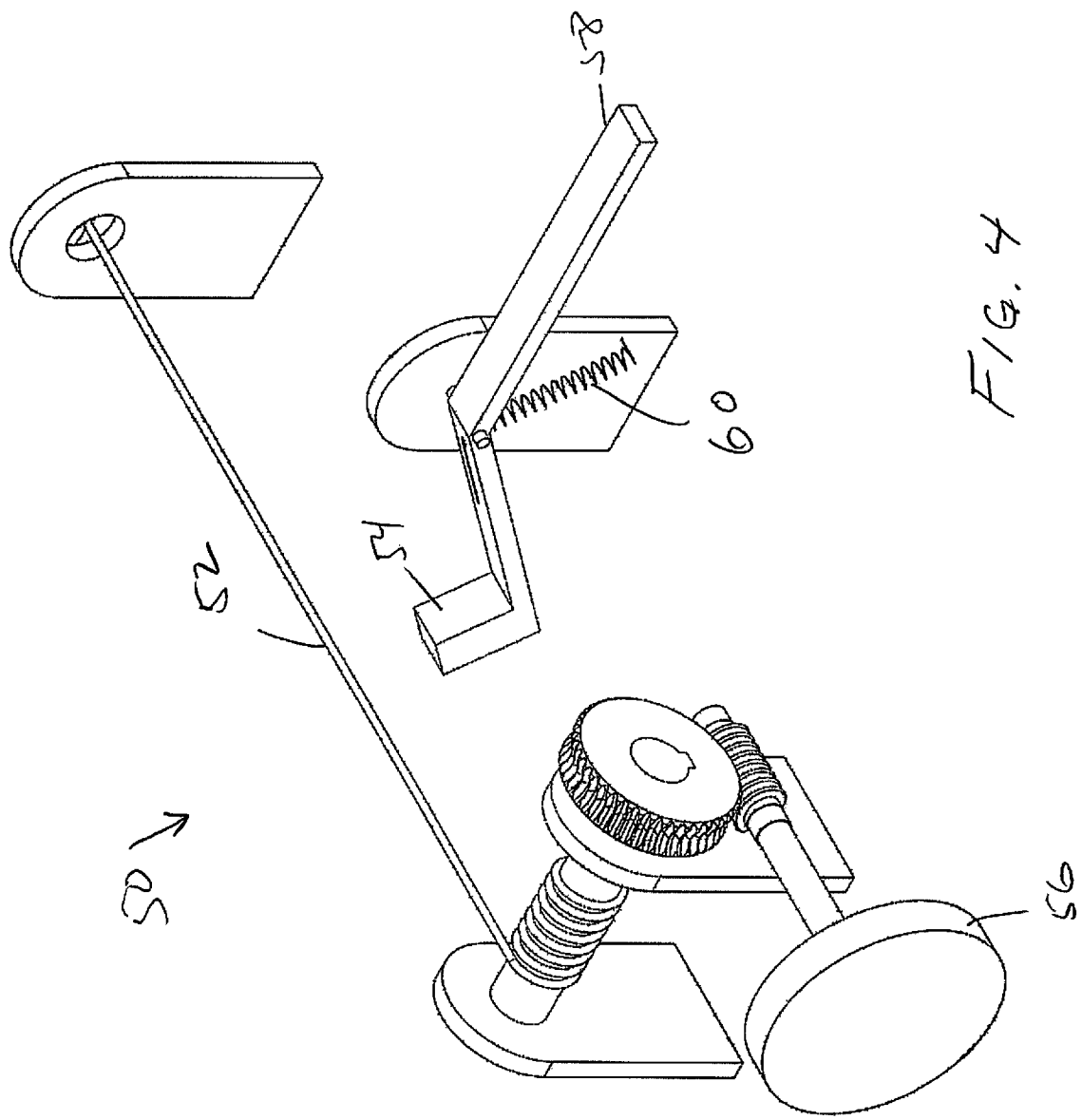

SIMPLE SOUND CONTROL OF UNDERWATER LIGHTS

This application claims benefit of provisional application Ser. No. 63/035,608, filed Jun. 5, 2020.

BACKGROUND OF THE INVENTION

This invention describes a method to control the output of lights used for imaging such as photography lights or video lights and other applications underwater.

When shooting video or photos underwater a diver typically carries a camera housing with two or more lights attached to the housing on arms that can be up to 3 to 4 feet in length, extending out from either side of the camera housing. In other cases lights may be set at a point some distance from the camera such as for lighting a wreck where lights are placed inside the wreck and the images are taken from a distance to capture the complete scene.

The lights need to be turned on/off as well as adjusted when on to achieve the ideal exposure. With only two hands it is awkward to reach to each light and adjust the settings. Remote control would be useful. In the case of lights placed at farther distance from the camera, it would be even more convenient to be able to remotely activate the lights and adjust their settings, without the need for wires.

There are wireless methods to communicate short distances underwater that can work with very low frequency radio waves. These systems require a receiving device in each light and a controller mounted on the camera housing that can be actuated to remotely control the lights. These controls are limited by the limited ability of RF frequencies to travel any distance underwater. They also require more expensive electronics.

Fiber optics can also be used to control lights with fiber optic cables running from the camera housing to each light. Fiber optic cable can direct light easily and cables are inexpensive. The controller is mounted on the camera housing and sends a light signal down the fiber optic cable to a receiving device located on the interior of the light separated from the water by a window that allows the control signal to travel through the window to the receiver. The signal generator is activated using a dial or button. Cabled systems are inexpensive but subject to the challenges of working with cables and connectors that can be dislodged and otherwise impaired to thereby disrupt the signals.

SUMMARY OF THE INVENTION

Given the simplicity of the control needs such as on/off or high, medium, low adjustment, and the fact that for most applications, one way communication is fine, the invention provides an audible frequency as the control signal. Sounds travel better underwater than in air, and about 4.5 times as fast. In the invention the light assembly is outfitted internally with a small microphone on a circuit board or connected through a circuit board interior to the light or light housing. There are wet mics available that alternatively could be mounted to the outside of the light housing with a sealed connection leading to the circuit in the interior of the lights. The circuit is tuned to listen for certain frequencies.

Sound travels easily through water. Interior to the light or housing is an air space where the microphone is placed; sound hitting the outside of the light enclosure will transmit the sound to the interior. The sound waves will travel from water surrounding the light in a manner that the microphone can easily detect. Once a specific frequency is detected, the light indexes on/off or steps through low, medium high output settings depending on the design and application needs. A double click, delivering the same frequency in rapid succession, can reset the system in the event that the balance between the lights becomes out of sync for some reason. The lights can easily be tuned to listen for different frequencies or select between a range of frequencies to allow divers in a group to isolate their lights from others and to respond only to commands from their control module.

Much like with fiber optic controls or wireless RF based controls, the sound frequency generator is housed in a small case attached to a handle on the camera housing in easy reach of the operator's fingers. A good analogy is a bike bell mounted on a handlebar. For example, the simplest version of the sound generator would be a metal piece tapping against another piece of metal. In practice the device is a small enclosure sealed from water that has a mechanical spring-loaded hammer that impacts a weighted device like a tuning fork. The element can be adjusted to emit a range of frequencies. The device could use a piezoelectric element or have electrical power to generate a wider range of frequencies from a digital circuit.

The light with the listening circuit has controls that allow it to be set in conjunction with the remotely mounted sound generator. The current underwater lights of the applicant herein have a display screen that can be used to synchronize the sound generator and light to respond to a designated frequency.

The invention provides a single and convenient control for an underwater diving luminaire, often spaced widely from a diver's underwater camera, by using coded audible sound signals sent through the ambient water surrounding the luminaire. Other advantages and features of the invention are discussed below with reference to the drawings.

DESCRIPTION OF THE DRAWINGS

FIG. 4 is a schematic view of a mechanical form of sound generator.

DESCRIPTION OF PREFERRED EMBODIMENTS

Figure 1:
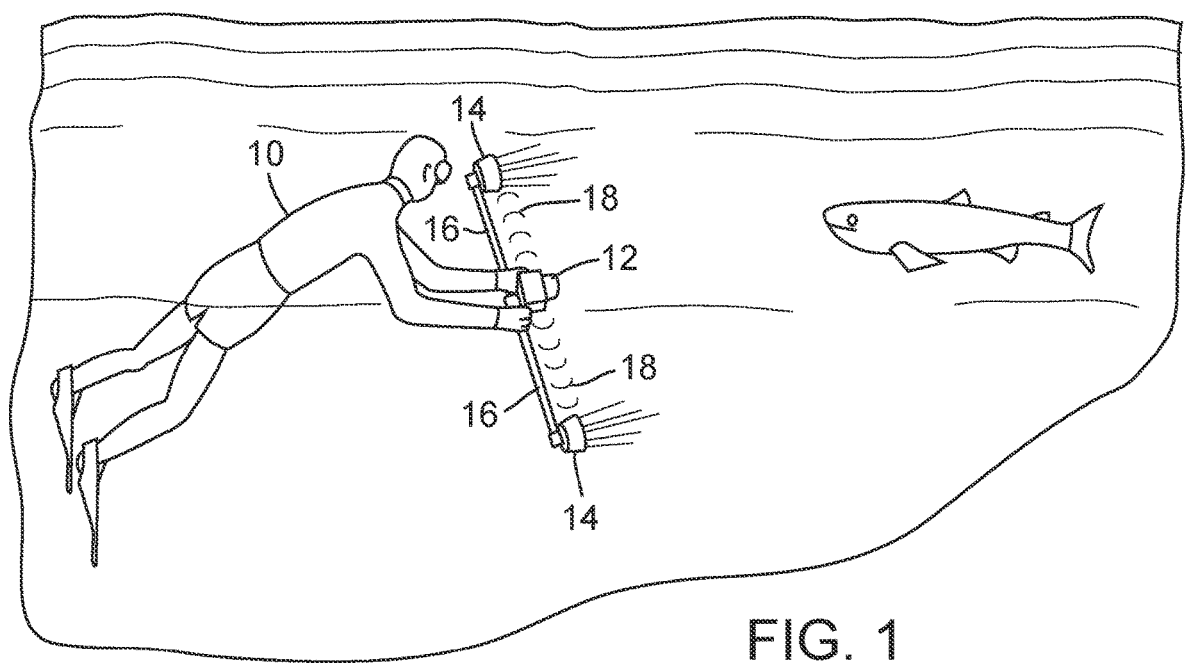
FIG. 1 is a schematic drawing indicating a diver using a camera underwater, with lights secured on outriggers and spaced away from the camera, and indicating sound signals from a device associated with the camera for operating the lights.

In the drawings FIG. 1 shows a diver 10 engaged in underwater photography or videography using a camera 12. The camera is accompanied by lights 14 attached via outriggers 16, so as to be spaced some distance left and right of the camera. At 18 are indicated sound waves traveling through the water for control of the lights via inputs on a control module on or at the camera.

Figure 2:
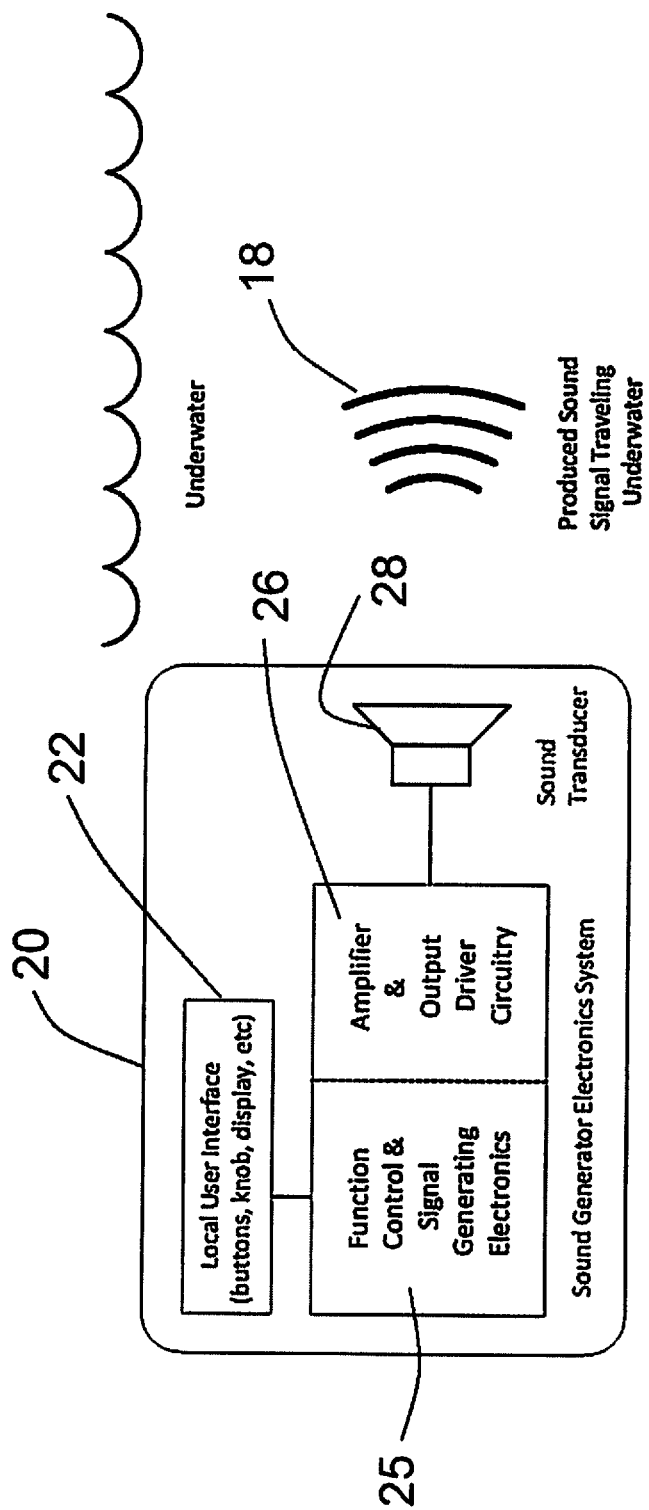
FIG. 2 is a schematic diagram indicating components of the user input device with sound generator.

FIG. 2 indicates the user's control module 20, which is on the camera or comprises a waterproof case attached to the camera. User input user interface control buttons or knobs, and preferably a display, are indicated at 22. These can be for turning the lights on and off, and/or for controlling light intensity or mode, such as steady or pulsing and potentially light color. The display can indicate selections to be made or status of the lights. In one embodiment the user input could be a single button, wherein successive depressions of the button will sequence through a series of light settings (which can include on/off), as is possible on some flashlights and bicycle lights. (The term "button" includes any depressable or contact or land-operated user input activation device.)

The user input is also shown connected to a sound generator 24, which could range from a simple bell or tuning fork that is struck mechanically, to an electronic sound generator such as indicated in the drawing. The electronic sound generator 24 includes function control and signal generating electronics 25 responsive to the user interface, connected to amplifier and output driver circuitry 26. The circuitry 26 drives a sound transducer or speaker 28, which can be within the case or an immersible transducer on the outside of the case or housing. The sound generator 24 operates within a selected frequency band, preferably but not necessarily audible to humans. The produced sound from the transducer or speaker 28 travels through the water as denoted by the sound waves 18. As noted above, sounds travel very efficiently through water.

Figure 3:
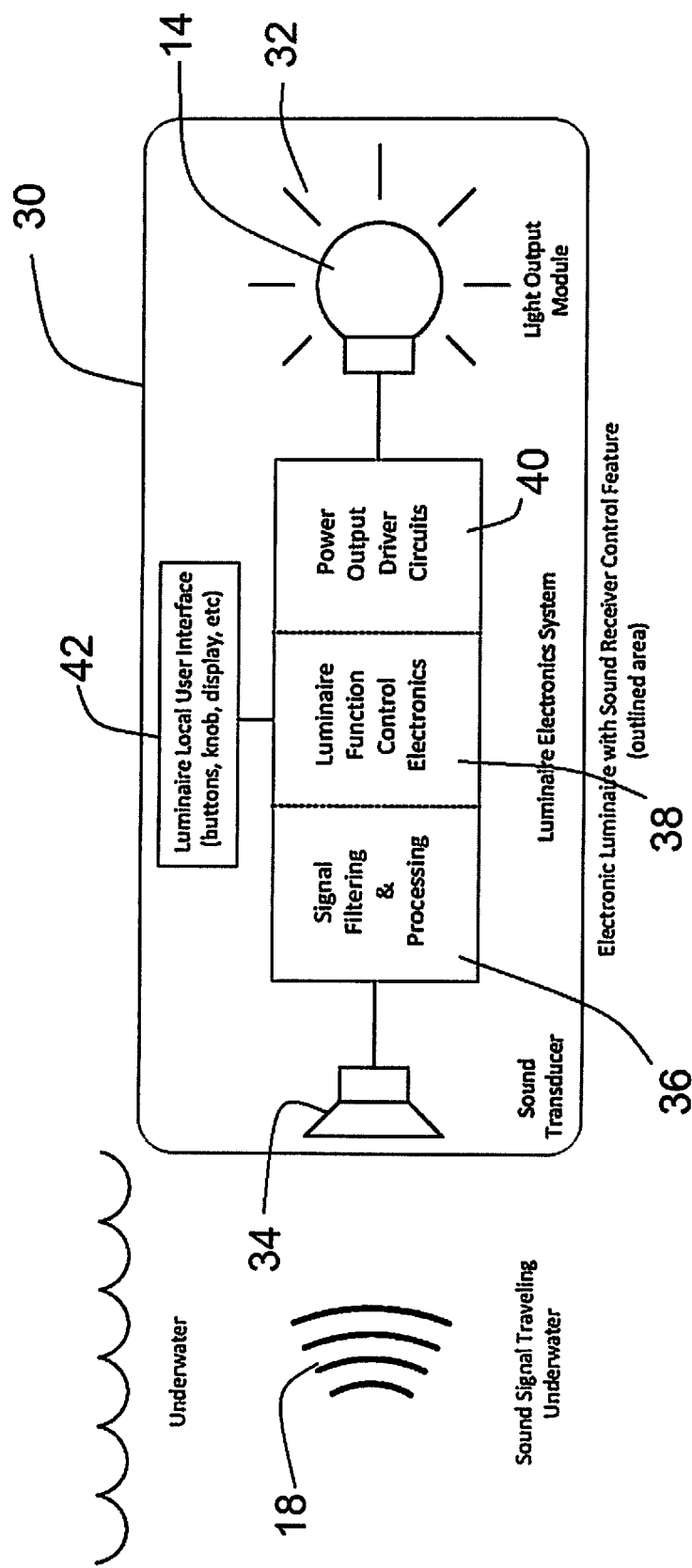
FIG. 3 is a schematic view showing components of the light controller at the receiving end of sound signals.

FIG. 3 indicates a light controlling box or luminaire housing 30, which can be a housing for the light or lights 14, or it can be a separate case or housing. Collectively the light, light controls and housing(s) can be referred to as a "light assembly". Light projection is indicated at 32.

In the light controlling unit 30 is a receiver or transducer 34, essentially a microphone, which picks up the control sounds issued from the transducer/speaker 28 of the unit 20, response device to be processed and utilized by a frequency and light controller of the unit 30. The signals from the transducer/receiver 34 are fed to a frequency analyzer, i.e. signal filtering and processing device 36 which recognizes the control frequency. The various possible control frequencies (narrow frequency bands) are preset into the device 36 so as to cause, when one of the control frequencies is received, the appropriate control signal to be sent to luminaire function control electronics 38, which send signals to power output driver circuits indicated at 40. The light or lights 14 are controlled accordingly. The light or lights are turned on or off, or increased or decreased in brightness, etc. Note that color of light may be one of the variables controllable by the sounds.

In FIG. 3 a user input local interface 42 is shown included with the light control housing 30. This is needed if basic light settings are to be made on the luminaire unit (such as when the sound driven control is only for on/off), or if the light control unit is to be to tunable by a user for a particular tone to be generated by the diver.

The invention can also be implemented with a mechanical sound generator, such as a tuning fork or a bell which is struck mechanically by an action of the diver (as by a spring-loaded hammer), the produced sound being at a frequency recognized by the receiving equipment in the light controlling box 30. Still further, the control sound could be made by the diver in other ways. For example the diver's humming sound at a particular pitch range could be effective, and for this purpose the light controlling receiver can be tunable as noted above, i.e. capable of calibration by the diver/user to a particular range of pitch. Alternatively, the user's action of striking metal (or other hard object) on metal, such as some form of tool or implement carried by or on the diver that can be struck against an outrigger 16, can be recognized by the receiver and effective to change light functions. The sound generator can be any device which generates repeatably similar sound wave characteristics by the mechanical power of the user actuating the device. The signaling device may have more than one mechanical actuator to generate multiple different or complex sound wave signal combinations.

FIG. 4 shows a self-contained remote underwater sound signaling device 50 constructed with a mechanical means of striking a tuned metal sound resonator object such as the illustrated taut string (or bell or tuning fork) 52 within the device. A striker is shown at 54, and this can be spring-loaded. An adjustment knob 56 can be included to tune the string 52 to a desired frequency. When the device is placed underwater, a specific sound signature is transmitted into the water when an actuating lever 58 is tripped, causing the striker 54 to strike the string 52, thus resulting in a strike with a trailing ring style sound and with a specific complex sound signature which may be detected by a receiver as shown in FIG. 3, using an underwater transducer whose electrical signal may be selectively filtered or otherwise electronically processed to discern the specific sound as representing a control command for an underwater luminaire. The striker and lever are returned to original position by a spring 60.

In another embodiment a self-contained remote underwater sound signaling device can be constructed with a sprung dish-shaped surface membrane made of such material as metal or plastic and with ends mechanically held in a frame. See U.S. Pat. No. 1,026,256 as an example. When immersed in the water and the sprung surface of the membrane is depressed mechanically over-center or released from this over-center of force state, the sprung membrane moves very rapidly to reduce its mechanical stress, thus resulting in a "click" style sound with a specific complex sound signature which may be detected by the receiver as in FIG. 3. Preferably the dish-shaped membrane has a self-returning characteristic so that once pressed to over-center position, it will return to the original configuration.

Although not shown in the drawings, the system may operate with bidirectional sound signals. The luminaire and integral circuitry as in FIG. 3 may generate and send coded sound signals to communicate its unit status back to the sound generator unit of FIG. 2, or to relay commands to other luminaires or user display devices.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A system for controlling one or more underwater diving lights, comprising:
    a user input device having at least one input button,
    the user input device including a sound generator for emitting into surrounding water, when actuated with the button, a sound of a selected frequency,
    a light assembly comprising said one or more underwater diving lights, at a position remote from the user input device, including a control housing with a microphone for receiving sounds transmitted through the water by the sound generator,
    the control housing including a frequency response device connected to the microphone for recognizing said selected frequency when received by the microphone, and for outputting a corresponding control signal, and
    the housing further including a light controller with driver circuitry connected to the one or more underwater diving lights, for receiving said control signal and changing one or more functions of the one or more underwater diving lights in response to said sound of selected frequency emitted by the sound generator.

2. The system of claim 1, wherein one said function of the one or more underwater diving lights comprises an on/off status function.

3. The system of claim 1, including a single said button, repeated pushing of the button causing the one or more underwater diving lights to go through a sequence of function settings including a series of light levels.

4. The system of claim 3, wherein the sequence of function settings includes on/off.

5. The system of claim 1, wherein the one or more functions include changing light color.

6. The system of claim 1, including two said underwater diving lights, each mounted on an outrigger from a camera housing held close to a diving operator positioned to use the input device.

7. The system of claim 1, including plurality of buttons on the user input device for selecting different functions.

8. The system of claim 1, wherein the user input device further includes a screen indicating light status or user selections to a diver as one or more functions are selected.

9. The system of claim 1, wherein the sound generator is capable of generating sounds at a plurality of selected frequencies, each frequency causing implementation of a selected function setting of the light.

10. The system of claim 9, wherein at least three different frequencies are generated.

11. The system of claim 1, wherein the said one or more functions are limited to a single on/off function.

12. The system of claim 1, wherein the sound generator comprises an electronic tone generator.

13. The system of claim 1, wherein the sound generator comprises a mechanical sound generator.

14. The system of claim 13, wherein the sound generator is a tuning fork or bell with a mechanical striker.

15. A system for controlling one or more underwater diving lights, comprising:
a light assembly comprising said one or more underwater diving lights, positioned to be remote from a diver when held by the diver, including a housing with a microphone for receiving sounds transmitted through ambient water,
the housing including a frequency response device connected to the microphone for recognizing a selected frequency of sound transmitted through the water and received by the microphone, and for outputting a corresponding control signal, and
the housing further including a light controller connected to the one or more underwater diving lights, for receiving said control signal and changing one or more functions of the one or more underwater diving lights,
whereby when a sound of said selected frequency is caused by a diver to be emitted, the light controller changes said one or more functions of the one or more underwater diving lights.

* * * * *